(12) United States Patent
Shen et al.

(10) Patent No.: US 11,853,870 B2
(45) Date of Patent: Dec. 26, 2023

(54) PHOTONIC SEMICONDUCTOR DEVICES AND METHODS FOR MANUFACTURING THE SAME

(71) Applicant: Nanjing Guangzhiyuan Technology Co., Ltd., Nanjing (CN)

(72) Inventors: Yichen Shen, Nanjing (CN); Huaiyu Meng, Nanjing (CN); Zhan Su, Nanjing (CN); Yanfei Bai, Nanjing (CN); Jinghui Zou, Nanjing (CN)

(73) Assignee: NANJING GUANGZHIYUAN TECHNOLOGY CO., LTD., Nanjing (CN)

( * ) Notice: Subject to any disclaimer, the term of this patent is extended or adjusted under 35 U.S.C. 154(b) by 19 days.

(21) Appl. No.: 17/727,223

(22) Filed: Apr. 22, 2022

(65) Prior Publication Data

US 2022/0343149 A1    Oct. 27, 2022

(30) Foreign Application Priority Data

Apr. 23, 2021   (CN) .......................... 202110438972.9

(51) Int. Cl.
*G06N 3/067* (2006.01)
*G02F 1/21* (2006.01)
(Continued)

(52) U.S. Cl.
CPC ........... *G06N 3/0675* (2013.01); *G02B 6/425* (2013.01); *G02B 6/4206* (2013.01); *G02F 1/212* (2021.01); *G02F 1/2257* (2013.01)

(58) Field of Classification Search
None
See application file for complete search history.

(56) References Cited

U.S. PATENT DOCUMENTS 9,377,587 B2 *   6/2016   Taylor .................... G02B 6/421
9,715,064 B1 *   7/2017   Gambino ................. G02B 6/43
(Continued)

FOREIGN PATENT DOCUMENTS

CN     107817562 A     3/2018
CN     108369314 A     8/2018

OTHER PUBLICATIONS

First Office Action issued in corresponding Chinese Application No. 202110438972.9; dated Jun. 25, 2021; 15 pgs.
(Continued)

*Primary Examiner* — Rhonda S Peace
(74) *Attorney, Agent, or Firm* — HAUPTMAN HAM, LLP

(57) ABSTRACT

A manufacturing method for a photonic device includes dividing a target photonic network, which is a photonic network configured for the photonic semiconductor device, into a plurality of sub-photonic networks, forming the plurality of sub-photonic networks on a plurality of photonic chips, and connecting the plurality of sub-photonic networks on the plurality of photonic chips through a coupler to obtain the photonic semiconductor device carrying the target photonic network, wherein the coupler is configured to couple light from one photonic chip to another photonic chip. Compared with the scale of the photonic network of the existing photonic semiconductor device, which is limited due to the footprint limitation of a single chip, the scale of the photonic network of the photonic semiconductor device is increased several times.

12 Claims, 7 Drawing Sheets

(51) Int. Cl.
  *G02B 6/42* (2006.01)
  *G02F 1/225* (2006.01)

(56) References Cited

U.S. PATENT DOCUMENTS

| | | | | |
|---|---|---|---|---|
| 10,268,232 | B2* | 4/2019 | Harris | G06E 3/003 |
| 10,514,509 | B2 | 12/2019 | Popovic et al. | |
| 10,877,229 | B2* | 12/2020 | Tummidi | G02B 6/42 |
| 11,163,120 | B2* | 11/2021 | Ardalan | G02B 6/30 |
| 11,694,071 | B2* | 7/2023 | Lee | G02B 5/1809 |
| | | | | 359/279 |
| 2017/0195064 | A1* | 7/2017 | Chang | H01S 5/0625 |
| 2021/0133547 | A1* | 5/2021 | Lin | G06N 3/067 |
| 2022/0343149 | A1* | 10/2022 | Su | G02B 6/425 |
| 2022/0405566 | A1* | 12/2022 | Winterbottom | G06F 7/5318 |
| 2023/0185021 | A1* | 6/2023 | Yu | G02B 27/0012 |
| | | | | 385/37 |

OTHER PUBLICATIONS

Second Office Action issued in corresponding Chinese Application No. 202110438972.9; dated Jul. 27, 2021; 10 pgs.

Rejection Decision issued in corresponding Chinese Application No. 202110438972.9; dated Aug. 17, 2021; 11 pgs.

Reexamination Notification issued in corresponding Chinese Application No. 202110438972.9; dated Feb. 21, 2022; 15 pgs.

* cited by examiner

PHOTONIC SEMICONDUCTOR DEVICES AND METHODS FOR MANUFACTURING THE SAME

CROSS-REFERENCE TO RELATED APPLICATION(S)

This application claims the benefit of, and priority to, the Chinese Patent Application No. 202110438972.9, filed on Apr. 23, 2021, which is herein incorporated by reference in its entirety.

FIELD OF THE INVENTION

The present invention relates to the field of photonic integrated circuits, and more particularly, to a photonic semiconductor device and a manufacturing method thereof.

BACKGROUND OF THE INVENTION

Artificial Neural Network (ANN) abstracts the human brain neuron network from the perspective of information processing, establishes a certain operation model, and forms different networks according to different connection methods. That is to say, the neural network is an operational model consisting of a large number of nodes (or neurons) connected to each other. Each node represents a specific output function, called the excitation function. The connection between each two nodes represents a weighted value for a signal passing through the connection, called a weight, which is equivalent to the memory of the artificial neural network. The output of the network varies according to the connection method of the network, the weight value and the excitation function. The network itself is usually an approximation of a certain algorithm or function in nature, and it may also be an expression of a logic strategy. When looking for an optimal solution to a complex problem, a large amount of computation is often required. The computing power and speed of digital electronic technology will eventually become the bottleneck of the development of artificial neural network.

Photonic neural networks is developing fast in recent years, promising orders of magnitude improvement in both energy efficiency and speed over digital electronics. Thousands of photonic devices could be integrated in a single chip, which corresponds to a matrix about 64×64 or 128× 128 in deep learning. Due to the footprint limitation of a single chip, it is difficult to further improve the scale of photonic neural network.

SUMMARY OF THE INVENTION

In view of the above-mentioned defects in prior arts, the present invention provides a photonic semiconductor device and a manufacturing method thereof to further increase the scale of the photonic neural network.

In one aspect, embodiments provide a method for manufacturing a photonic semiconductor device, comprising dividing a target photonic network which is a photonic network configured for the photonic semiconductor device into a plurality of sub-photonic networks; forming the plurality of sub-photonic networks on a plurality of photonic chips; connecting the plurality of sub-photonic networks on the plurality of photonic chips through a coupler to obtain the photonic semiconductor device carrying the target photonic network, wherein the coupler is configured to couple light from one photonic chip to another photonic chip.

In some embodiments, connecting the plurality of sub-photonic networks comprises overlapping the plurality of photonic chips to form a stacked structure, and connecting the sub-photonic networks on adjacent photonic chips through the coupler.

In some embodiments, connecting the plurality of sub-photonic networks comprises tiling the plurality of photonic chips, and connecting the sub-photonic networks on adjacent photonic chips through the coupler.

In some embodiments, the coupler includes at least one of a grating coupler, an adiabatic coupler, and an edge coupler.

In some embodiments, the target photonic network comprises a photonic neural network.

In some embodiments, the photonic neural network comprises a Mach-Zehnder interferometer network.

In some embodiments, the input signal of the photonic neural network is modulated on-chip using a multimode interferometer array and a Mach-Zehnder modulator array.

In another aspect, embodiments provide a photonic semiconductor device comprising a plurality of photonic chips connected by a coupler configured to couple light from one photonic chip to another photonic chip.

In some embodiments, the plurality of photonic chips are configured in a stacked structure, and adjacent photonic chips are connected through the coupler.

In some embodiments, the plurality of photonic chips are configured in a tiled structure, and adjacent photonic chips are connected through the coupler.

In some embodiments, the coupler includes at least one of a grating coupler, an adiabatic coupler, and an edge coupler.

In some embodiments, the photonic integrated circuit on each photonic chip includes a portion of a photonic neural network. The photonic integrated circuits on the plurality of photonic chips are connected through the coupler to form a complete photonic neural network.

In some embodiments, the photonic neural network comprises a Mach-Zehnder interferometer network.

In some embodiments, the input signal of the photonic neural network is modulated on-chip by a multimode interferometer array and a Mach-Zehnder modulator array.

According to the embodiments of the present invention, a photonic network is divided into a plurality of sub-networks formed on a plurality of photonic chips, and the plurality of photonic chips are coupled to connect the plurality of sub-networks to each other to form a complete photonic network. Compared with the photonic network carried by a single photonic chip, the scale of the photonic network formed by the embodiments can be increased several times. Accordingly, the energy efficiency and processing speed of the photonic semiconductor device provided by the embodiments can also be increased several times.

Aspects, features, advantages and the like of the embodiments will be described in greater detail by reference to the drawings. The aspects, features, advantages and the like will be apparent according to the detailed description by reference to the drawings.

DETAILED DESCRIPTION OF THE INVENTION

In order to facilitate understanding of various aspects, features and advantages of the technical solutions of the present invention, the present invention will be described in detail below with reference to the drawings. It should be understood that the following various embodiments are only used for illustration, but not for limiting the protection scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Figure 1:
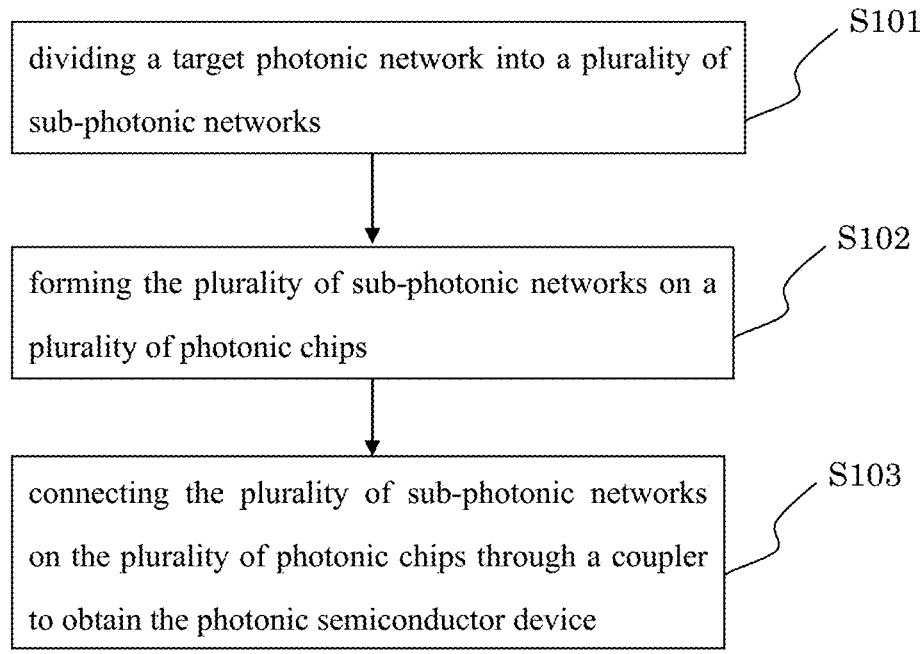
FIG. 1 is a flowchart of a method for manufacturing a photonic semiconductor device according to an embodiment of the present invention.

FIG. 1 illustrates a method of manufacturing a photonic semiconductor device according to an embodiment of the present invention. In the embodiment, the method comprises: at S101, dividing a target photonic network that is a photonic network set for the photonic semiconductor device into a plurality of sub-photonic networks; at S102, forming the plurality of sub-photonic networks on a plurality of photonic chips; at S103, connecting the plurality of sub-photonic networks on the plurality of photonic chips through a coupler to obtain the photonic semiconductor device carrying the target photonic network, wherein the coupler is configured to couple light from one photonic chip to another photonic chip.

According to the embodiment, the scale of the target photonic network can be increased several times compared to a single photonic chip for carrying a photonic network. Therefore, compared with the scale of the photonic network of the existing photonic semiconductor device, which is limited due to the footprint limitation of a single chip, the scale of the photonic network of the photonic semiconductor device according to the embodiment of the present invention can be increased several times. And the computing power and energy efficiency of the photonic semiconductor device according to the embodiment of the present invention can also be improved accordingly.

Figure 2:
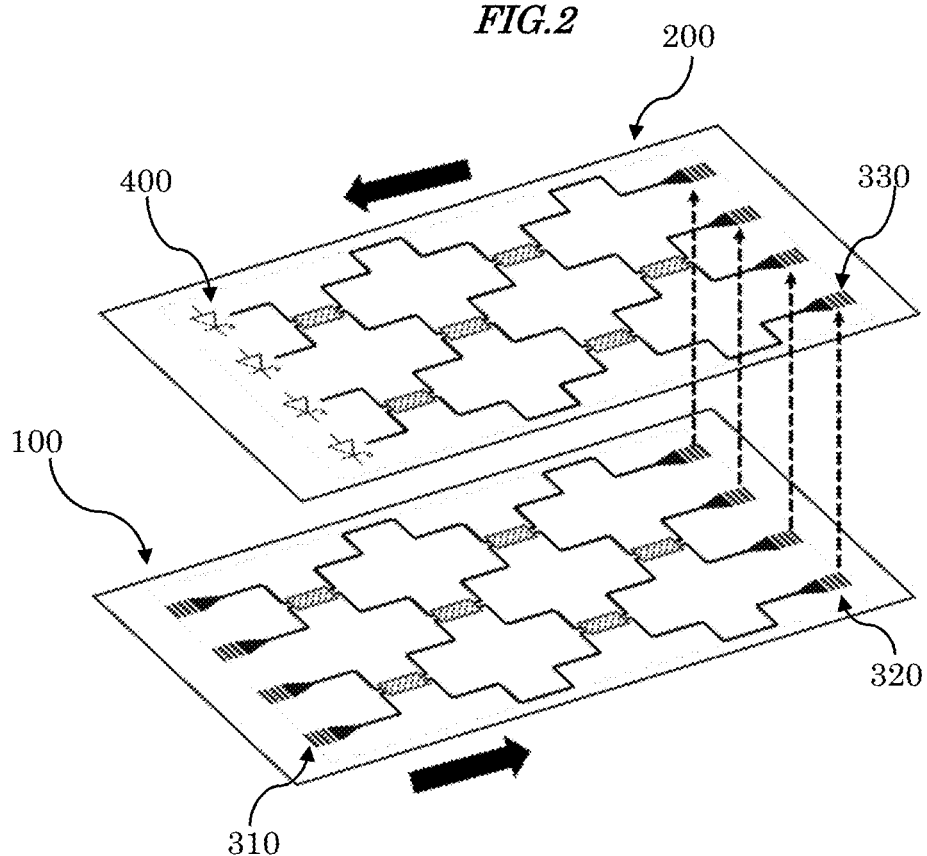
FIG. 2 is a schematic diagram showing that two photonic chips are stacked and connected by a coupler in an embodiment of the present invention.

In the embodiment as shown in FIG. 2, a photonic chip 200 is mounted on a photonic chip 100, and both photonic chips are connected by grating couplers 320 and 330 as optical couplers. A first photonic integrated circuit as a sub-photonic network is formed on the photonic chip 100. At the input side of the first photonic integrated circuit, multiple light beams, for example, 4 light beams are input through a grating coupler 310. At the output side of the first photonic integrated circuit, the grating coupler 320 is connected to the grating coupler 330 at the input side of the photonic chip 200. A second photonic integrated circuit as another sub-photonic network is formed on the photonic chip 200, the grating coupler 330 at the input side of the second photonic integrated circuit is connected to the grating coupler 320 at output side of the photonic chip 100. The grating couplers 320, 330 act as optical vias to couple light from the photonic chip 100 into the photonic chip 200, such that the first photonic integrated circuit and the second photonic integrated circuit form a complete photonic network comprising the two sub-photonic networks. As shown by arrows in FIG. 2, a plurality of light beams are input through the grating coupler 310 on the input side and processed by the first photonic integrated circuit on the photonic chip 100, then coupled to the photonic chip 200 through the grating couplers 320 and 330 and processed by the second photonic integrated circuit, so that the input light beams are processed by the complete photonic network, and then output to a plurality of photoelectric elements 400, which can convert the processed optical signals into electrical signals for subsequent processing circuits or processors for further processing.

In one embodiment of the present invention, the photonic semiconductor device comprises two stacked photonic chips 100, 200. The photonic chips 100, 200 are connected to each other by the grating couplers 320, 330 capable of coupling light from one photonic chip 100 to another photonic chip 200.

Figure 4:
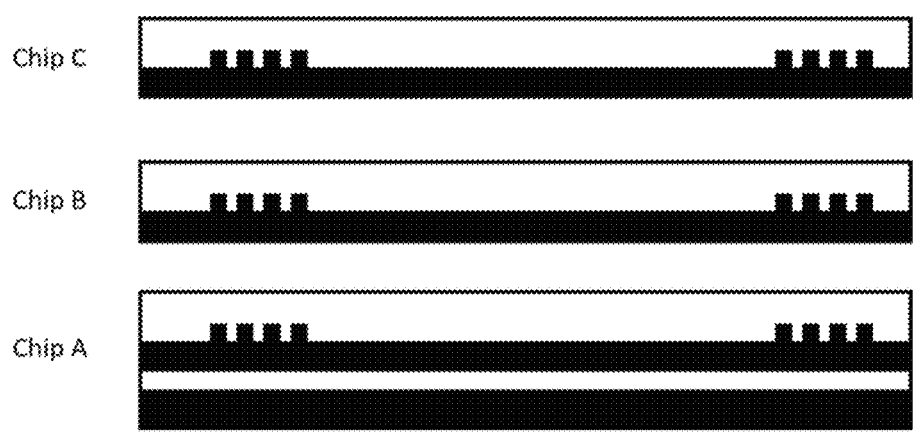
FIG. 4 is a schematic diagram of a photonic semiconductor device according to another embodiment of the present invention in which three photonic chips are stacked.

In another embodiment of the present invention, as shown in FIG. 4, the photonic semiconductor device may include three photonic chips, i.e., Chip A, Chip B, and Chip C, wherein Chip C overlaps Chip B that overlaps Chip A to form a stacked chip structure. Adjacent photonic chips are connected through a coupler. Specifically, Chip A is connected to Chip B through a grating coupler and Chip B is connected to Chip C through another grating coupler, such that the photonic integrated circuits on the photonic chips can form a complete photonic network.

In other embodiments of the present invention, the number of photonic chips is not limited to 2 or 3, but may be 4 or more 4 or more photonic chips are stacked to form a stacked structure, and adjacent photonic chips are stacked and connected by a coupler.

Figure 3:
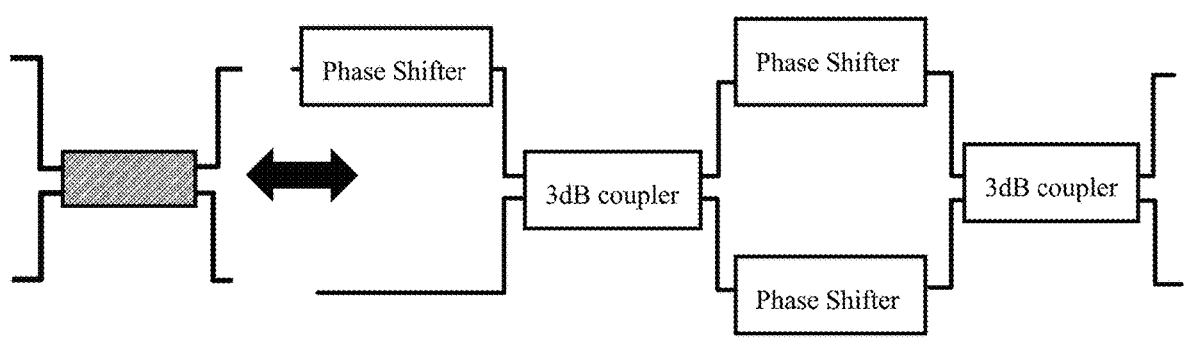
FIG. 3 is a schematic structural diagram of a Mach-Zehnder interferometer used in a photonic neural network according to an embodiment of the present invention.

In certain embodiments, the photonic integrated circuit on a single photonic chip includes a part of a photonic neural network, and the photonic integrated circuits on a plurality of photonic chips are connected by couplers to form a complete photonic neural network. The photonic neural network may include a Mach-Zehnder Interferometer (MZI) network. For example, in FIG. 2, the rectangle with diagonal strips stands for MZI. As shown in FIG. 3, the MZI may include phase shifters and 3 dB couplers, and can be dynamically tuned.

Figure 5:
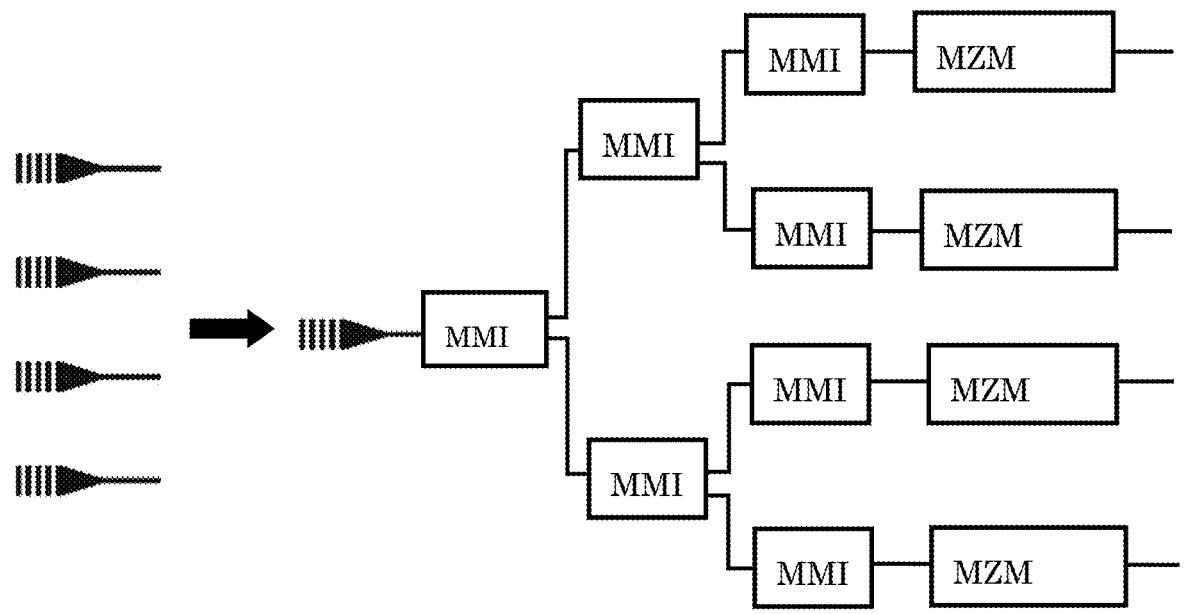
FIG. 5 shows an example in which the off-chip modulation of the input signal of the photonic neural network shown in FIG. 2 is replaced with on-chip modulation.

In an optional embodiment, the off-chip modulation of the input signal of the photonic neural network can be replaced with on-chip modulation. For example, a multimode interferometer (MMI) array and Mach-Zehnder modulator (MZM) array are adopted to perform the on-chip modulation of the input signal of the photonic neural network. As shown in FIG. 5, the left side of the figure shows four couplers through which four different modulated signals that are modulated outside the chip are input. The right side of FIG. 5 shows the case where the input signal is modulated inside the chip. In this case, only one input signal is input through one coupler and the one input signal is modulated by the MMI array and MZM array inside the chip to form four different modulated signals. For example, the four grating couplers on the photonic chip 100 shown in FIG. 2 can be replaced with one grating coupler and the MMI array and the MZM array. In the embodiment shown in FIG. 2, four light sources are required for the photonic chip 100 to input four light beams (i.e., four different modulated signals). As shown in FIG. 5, using one grating coupler, MMI array and MZM array on the right side of the figure to replace the four grating couplers on the left side, only one light source is required to generate four beams (i.e., four different modulated signals). Therefore, the number of light sources can be reduced, such that the complexity of the device can be reduced and the compactness of the device can be improved.

In an optional embodiment of the present invention, in addition to the stacking of multiple photonic chips as shown in FIG. 2 and FIG. 4 to form a stacked structure, multiple photonic chips can also be spread out in the horizontal direction and connected to each other through at least one coupler to form a photonic semiconductor device. In the photonic semiconductor device, the multiple photonic chips are formed in a tiled structure and the photonic networks on adjacent photonic chips are connected to each other by couplers. The coupler may be, but not limited to, an edge coupler (or end-face coupler) when multiple photonic chips are tiled in the horizontal direction.

In one embodiment of the present invention, due to the symmetry of cascaded MZI network, the large-scale target photonic neural network can be divided into several sub-photonic networks, and each sub-photonic network can be implemented on a smaller chip. In this way, the scale of photonic neural network can be significantly improved, which would further enhance the computation power of photonic neural network or photonic semiconductor device.

Figure 6:
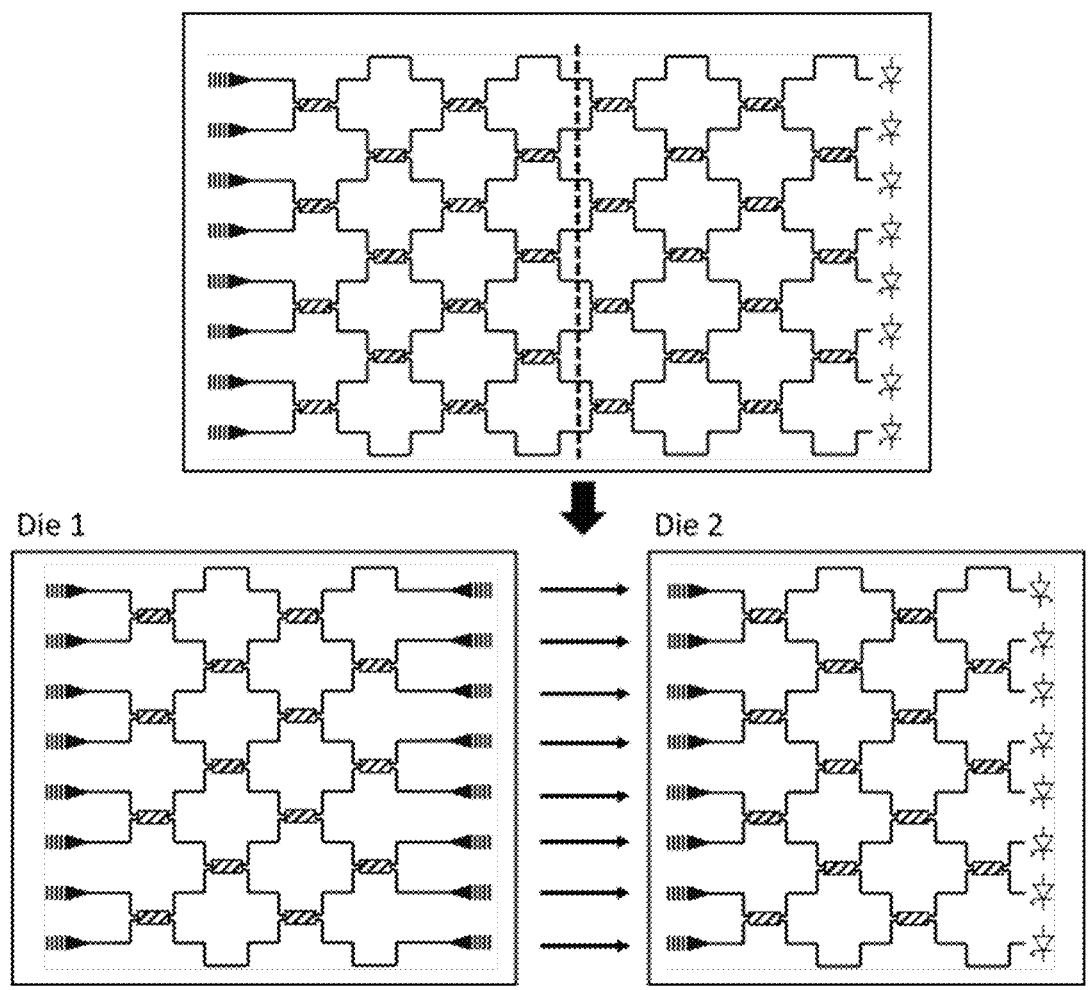
FIG. 6 is a schematic diagram showing that a Mach-Zehnder interferometer network is divided into two sub-networks which are formed on two photonic chips in an embodiment of the present invention.

As shown in FIG. 6, taking an 8×8 MZI network as an example, it can be divided into two sub-photonic networks, which are formed on the two dies, i.e., Die 1 and Die 2 respectively. Based on the symmetry of the cascaded 8×8 MZI network, in FIG. 6, the 8×8 MZI network can be equally divided into two sub-networks along the dashed line. In an optional embodiment, in addition to dividing the MZI network equally along the dashed line shown in FIG. 6, the MZI network can also be divided in other ways as needed, for example, the MZI network could be equally divided along a dividing line (not shown) in the horizontal direction orthogonal to the dashed line shown in FIG. 6.

In one embodiment of the present invention, Die 1 and Die 2 may be stacked and interconnected through a grating coupler. In an alternative embodiment, Die 1 and Die 2 can be tiled and interconnected by an edge coupler (or end-face coupler).

Figure 7A:
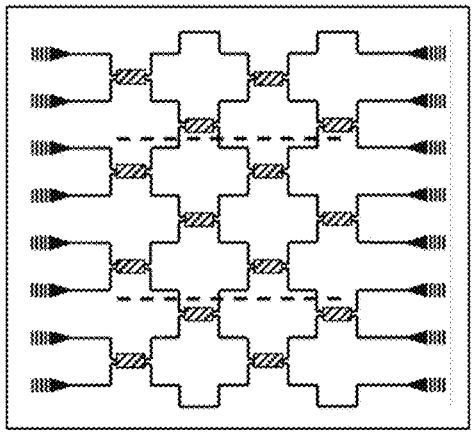
FIG. 7a shows an example in which one sub-network shown in FIG. 6 is further divided into multiple sub-networks which are formed on two photonic chips.
Figure 7A:
Figure 7A:
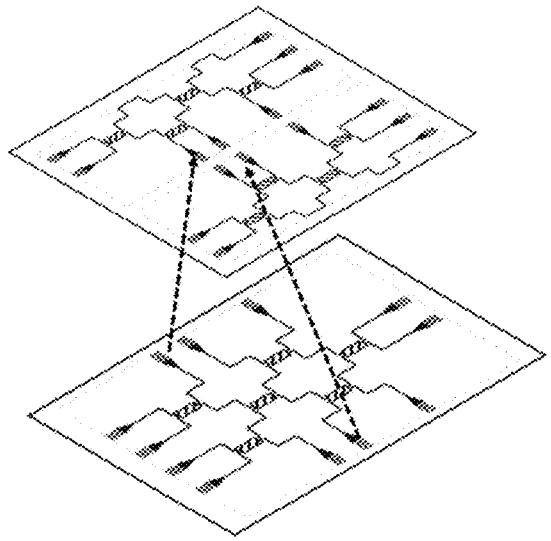

In some embodiments, as shown in FIG. 7a, the photonic network formed on Die 1 can be further divided into three sub-networks along the dotted lines. The three sub-networks include two smaller sub-networks respectively close to upper and lower sides that are formed on Die a, and a larger sub-network in the middle that is formed on Die b. On Die a, the respective grating couplers for coupling Die b of the two smaller sub-networks are arranged to face each other, and are respectively connected to the grating couplers on the opposite sides of Die b, thereby realizing the interconnection and intercommunication of the optical signals of the three sub-networks. In an optional embodiment, the photonic network on Die 1 can be arbitrarily divided as needed. In other embodiments, the photonic network formed on Die 2 in FIG. 6 can be divided similar to the embodiment shown in FIG. 7a.

Figure 7B:
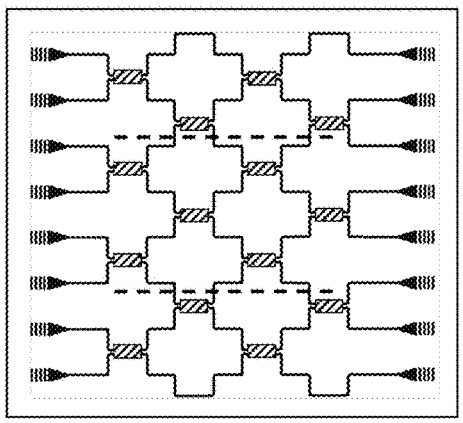
FIG. 7b shows another example in which one sub-network shown in FIG. 6 is further divided into multiple sub-networks which are formed on two photonic chips.
Figure 7B:
Figure 7B:
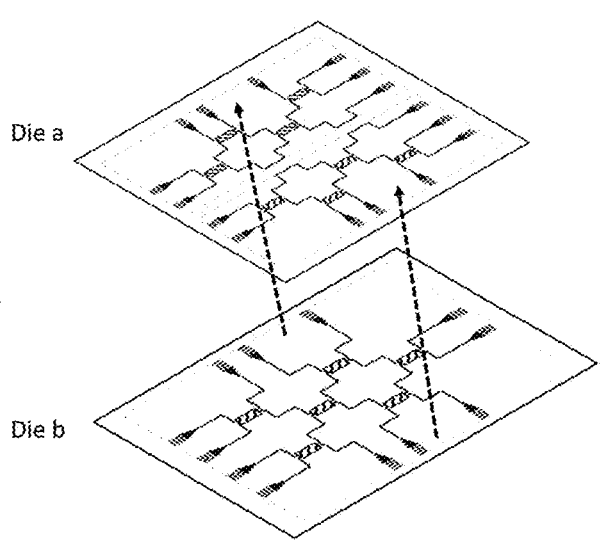

In another optional embodiment, as shown in FIG. 7b, the photonic network formed on Die 1 can be further divided into three sub-networks along the dotted lines. The three sub-networks include two smaller sub-networks respectively close to upper and lower sides, which are formed on Die a, and a larger sub-network in the middle, which is formed on Die b. On Die a, the grating couplers of the two sub-networks respectively coupling Die b are arranged on opposite sides of Die a, and are respectively connected to the grating couplers arranged on the opposite sides of Die b, such that the grating couplers of Die a and Die b can be substantially stacked in vertical direction, which is convenient for packaging. Moreover, when Die a and Die b are attached together, the grating couplers of the two dies overlap and are connected to each other, thereby realizing the interconnection and intercommunication of the optical signals of the three sub-networks. In other embodiments, the photonic network formed on Die 2 in FIG. 6 can be divided similar to the embodiment shown in FIG. 7b.

Figure 8:
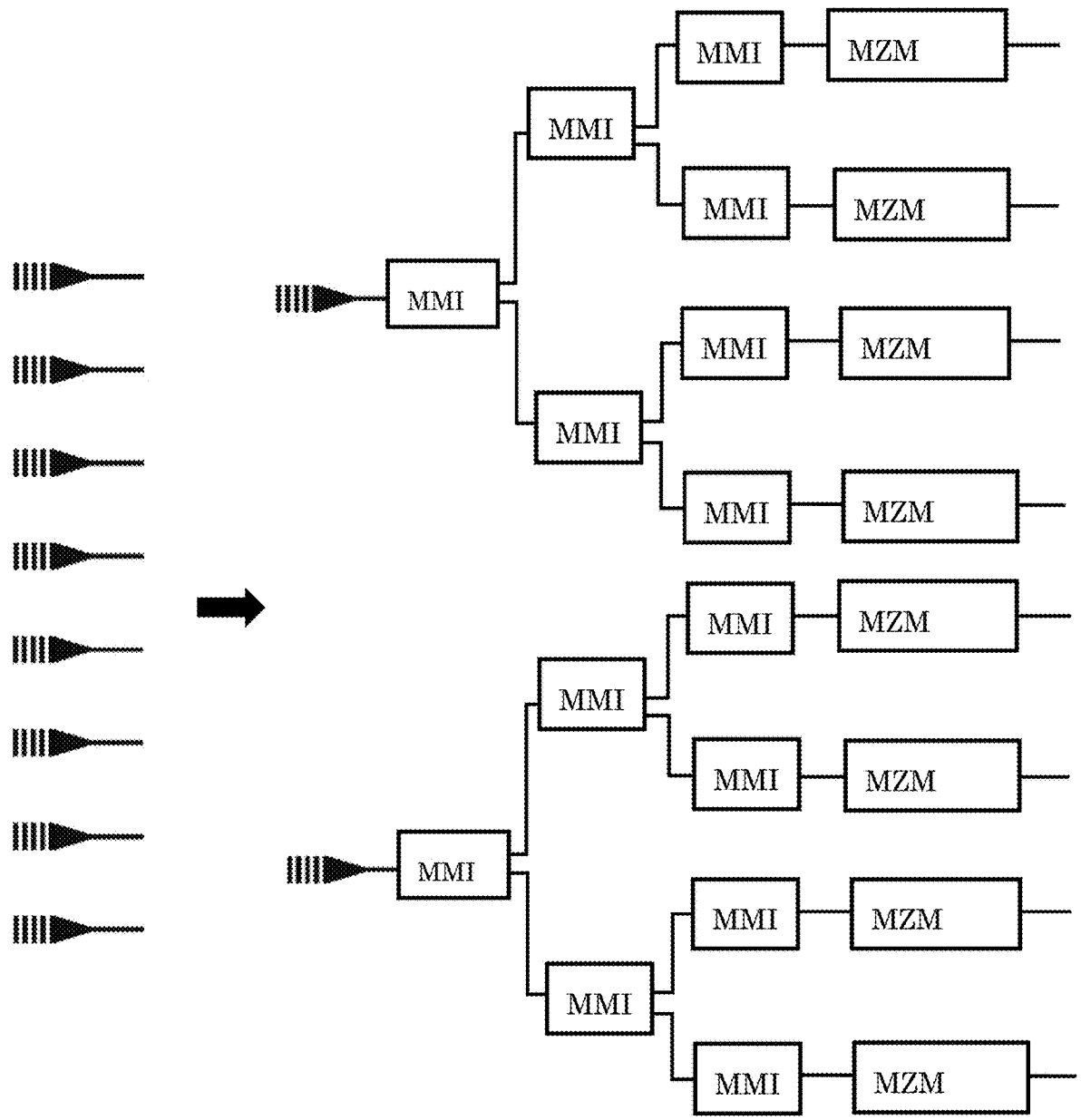
FIG. 8 shows an example in which the off-chip modulation of the input signal of the photonic neural network shown in FIG. 6 is replaced with on-chip modulation.

In the embodiment shown in FIG. 6, the input side of the photonic neural network needs 8 grating couplers to input light beams from 8 light sources. In an alternative embodiment, as shown in FIG. 8, two grating couplers and two MMI arrays and MZM arrays are formed on the photonic chip to generate 8 beams, so that only 2 light beams from 2 light sources need to be input. It can be seen that, compared with the embodiment shown in FIG. 6, the embodiment shown in FIG. 8 can further reduce the number of light sources of the photonic semiconductor device and the complexity of the equipment, and further save space. The saved space can be further used for photonic neural networks, thereby further improving the scale and processing power of photonic neural network.

In an optional embodiment, a 64×64 MZI network can be divided into a plurality of sub-photonic networks, which are formed on a plurality of photonic chips. The sub-photonic networks on the plurality of photonic chips are connected by multiple grating couplers to obtain a photonic semiconductor device carrying the 64×64 MZI network. Of course, the present invention is not limited thereto, and photonic semiconductor devices of MZI networks of any scale can be fabricated according to the embodiments of the present invention.

Figure 9:
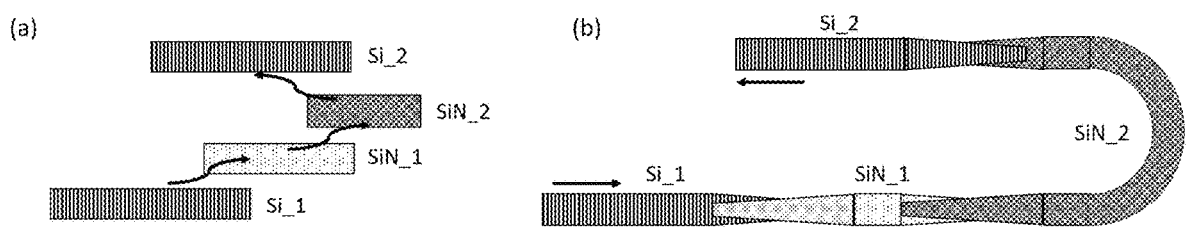
FIG. 9 is a schematic diagram showing the principle and structure of an adiabatic coupler used in another embodiment of the present invention.

In an optional embodiment, an adiabatic coupler can be used to replace some or all of the grating couplers in all the above embodiments, in other words, the adiabatic coupler can be used to form the optical vias. As indicated by the arrows in part (a) of FIG. 9, the light transmitted by the silicon waveguide Si_1 can be coupled to the silicon waveguide Si_2 through the silicon nitride layers SiN_1 and SiN_2. Based on this principle, as shown in part (b) of FIG. 9, a silicon waveguide Si_1, silicon nitride layers SiN_1 and SiN_2 can be formed in one photonic chip, and the silicon waveguide Si_1 is coupled to the silicon nitride layer SiN_1 that is coupled to the silicon nitride layer SiN_2. The silicon nitride layer SiN_2 is formed to a bend waveguide that is reversed upward by 180 degrees and coupled to the silicon waveguide Si_2 formed in another photonic chip on upper layer. As a result, as shown by the arrow in part (b) of FIG. 9, light is coupled from the silicon waveguide Si_1 of one photonic chip to the silicon nitride layer SiN_1, and then coupled to the silicon nitride layer SiN_2. The light is reversed 180 degrees at the silicon nitride layer SiN_2 and coupled to the silicon waveguide Si_2 on the other photonic chip. Silicon waveguide Si_2. As a result, the light from one photonic chip is coupled to another photonic chip in the stack. In an alternative embodiment, in a tiled structure, the silicon nitride layer SiN_2 does not need to be reversed upward by 180 degrees, but is coupled to a silicon waveguide Si_2 formed in another photonic chip of the tiled structure. In this way, a light from one photonic chip can be coupled to the other photonic chip of the tiled structure.

A person of ordinary skill in the art should understand that the various embodiments and examples disclosed herein are described for purpose of illustration only. It is not intended to be exhaustive or to limit the invention. Many modifications and variations are possible in light of the above teaching and the scope of the appended claims should be construed as broadly as the prior art will permit. For example, although the present invention is described by taking the MZI network as an example, those skilled in the art should understand that, based on the teaching of the embodiments of the present invention and the appended claims, the incoherent photonic network can also be divided into multiple sub-networks, which are interconnected by at least one coupler (such as grating coupler, adiabatic coupler or edge coupler), thereby scaling up the incoherent photonic networks of semiconductor devices.

What we claimed is:

1. A method for manufacturing a photonic semiconductor device, comprising:
   dividing a photonic neural network which is a photonic network configured for the photonic semiconductor device into a plurality of sub-photonic networks;
   forming the plurality of sub-photonic networks on a plurality of photonic chips;
   connecting the plurality of sub-photonic networks on the plurality of photonic chips through a coupler to obtain the photonic semiconductor device carrying the photonic neural network, wherein the coupler is configured to couple light from one photonic chip to another photonic chip.

2. The method of claim 1, wherein connecting the plurality of sub-photonic networks comprises:
   overlapping the plurality of photonic chips to form a stacked structure, and
   connecting the sub-photonic networks on adjacent photonic chips through the coupler.

3. The method of claim 1, wherein connecting the plurality of sub-photonic networks comprises:
   tiling the plurality of photonic chips, and
   connecting the sub-photonic networks on adjacent photonic chips through the coupler.

4. The method of claim 1, wherein the coupler comprises at least one of a grating coupler, an adiabatic coupler, and an edge coupler.

5. The method of claim 4, wherein the photonic neural network comprises a Mach-Zehnder interferometer network.

6. The method of claim 5, wherein the input signal of the photonic neural network is modulated on-chip using a multimode interferometer array and a Mach-Zehnder modulator array.

7. A photonic semiconductor device, comprising a plurality of photonic chips connected by a coupler configured to couple light from one photonic chip to another photonic chip;
   wherein the photonic integrated circuit on each photonic chip comprises a portion of a photonic neural network;
   the photonic integrated circuits on the plurality of photonic chips are connected through the coupler to form a complete photonic neural network.

8. The photonic semiconductor device of claim 7, wherein the plurality of photonic chips is configured in a stacked structure, and adjacent photonic chips are connected through the coupler.

9. The photonic semiconductor device of claim 7, wherein the plurality of photonic chips is configured in a tiled structure, and adjacent photonic chips are connected through the coupler.

10. The photonic semiconductor device of claim 7, wherein the coupler comprises at least one of a grating coupler, an adiabatic coupler, and an edge coupler.

11. The photonic semiconductor device of claim 10, wherein the photonic neural network comprises a Mach-Zehnder interferometer network.

12. The photonic semiconductor device of claim 11, wherein the input signal of the photonic neural network is modulated on-chip by a multimode interferometer array and a Mach-Zehnder modulator array.

* * * * *